(12) United States Patent  (10) Patent No.: US 6,738,021 B2
Benner et al.  (45) Date of Patent: May 18, 2004

(54) SYSTEM AND METHOD FOR DETECTION AND FEATURE EXTRACTION IN PASSIVE COHERENT LOCATION APPLICATIONS

(75) Inventors: Robert H. Benner, Gaithersburg, MD (US); Kevin W. Baugh, Gaithersburg, MD (US)

(73) Assignee: Lockheed Martin Corporation, Gaithersburg, MD (US)

( * ) Notice: Subject to any disclaimer, the term of this patent is extended or adjusted under 35 U.S.C. 154(b) by 0 days.

(21) Appl. No.: 10/138,508

(22) Filed: May 6, 2002

(65) Prior Publication Data

US 2003/0001778 A1 Jan. 2, 2003

Related U.S. Application Data

(60) Provisional application No. 60/288,493, filed on May 4, 2001.

(51) Int. Cl.[7] .................................................. G01S 3/02
(52) U.S. Cl. ....................................... 342/451; 342/378
(58) Field of Search .............................. 342/378, 450, 342/451, 452

(56) References Cited

U.S. PATENT DOCUMENTS

| 3,242,487 A | 3/1966 | Hammack |
| 3,270,340 A | 8/1966 | Hammack |
| 3,286,263 A | 11/1966 | Hammack |

(List continued on next page.)

FOREIGN PATENT DOCUMENTS

| DE | 38 18 813 C | 6/1999 |
| FR | 2 776 438 A | 9/1999 |

OTHER PUBLICATIONS

Schwenke, Roger W., Sensitivity Analysis of an Estimator–Correlator for the Detection of Spread Targets with Multiple Discrete Highlights, The Pennsylvania State University, Dec. 2000, pp I–13.

Holt, J.M. et al., MIDAS–W: a workstation–based incoherent scatter radar data acquisition system, Massachusetts Institute of Technology, Jun. 2000, pp 1231–1241.

Martinez, David R., Application of Parallel Processors to Real–Time Sensor Array Processing, MIT Lincoln Laboratory, pp 1–7.

Jianqi, Wu, et al., Researches of a New Kind of Advanced Metric Wave Radar, East of China Research Institude of Electronic Engineering, 1999, pp. 194–197.

International Search Report, dated Feb. 20, 2003, for Application No. PCT/US02/14068.

D.J. Thomson et al., A Match–Field Backpropagation Algorithm For Source Localization, IEEE Oct. 6, 1997, pp. 602–607.

(List continued on next page.)

*Primary Examiner*—Dao Phan
(74) *Attorney, Agent, or Firm*—Hogan & Hartson L.L.P.

(57) ABSTRACT

A system and method for detection and feature extraction in a passive coherent location system is disclosed. During a coherent processing interval, detection and feature extraction operations are performed to determine peak detections and target parameters for targets. The system forms an ambiguity surface that has ambiguity surface data or the coherent processing interval. Bins from a previous ambiguity surface are associated with the ambiguity surface data. New bins are identified for new target echoes within the ambiguity surface. Peak detections are formed from the bins. The peak detections correlate to the target echoes of the coherent processing interval. Target parameters for the targets are estimated from the peak detections.

57 Claims, 7 Drawing Sheets

U.S. PATENT DOCUMENTS

| | | |
|---|---|---|
| 3,573,611 A | 4/1971 | Bergemann et al. .......... 324/57 |
| 3,706,096 A | 12/1972 | Hammack |
| 3,786,509 A | 1/1974 | Applebaum et al. ....... 343/17.1 |
| 3,795,911 A | 3/1974 | Hammack ...................... 343/9 |
| 3,972,000 A | 7/1976 | Desblache et al. .......... 329/105 |
| 4,114,153 A | 9/1978 | Neidell ........................... 343/9 |
| 4,994,809 A | 2/1991 | Yung et al. ................. 342/108 |
| 5,192,955 A | 3/1993 | Hoang .......................... 342/80 |
| 5,252,980 A | 10/1993 | Gray et al. ................... 342/59 |
| 5,381,156 A | 1/1995 | Bock et al. ................. 342/126 |
| 5,451,960 A | 9/1995 | Kastella et al. ............... 342/59 |
| 5,525,995 A | 6/1996 | Benner ........................ 342/90 |
| 5,604,503 A | 2/1997 | Fowler et al. .............. 342/378 |
| 5,623,267 A | 4/1997 | Wurman ...................... 342/26 |
| 5,912,640 A | 6/1999 | Bradford et al. ............. 342/99 |
| 5,943,170 A | 8/1999 | Inbar et al. ................. 359/561 |
| 5,990,831 A | 11/1999 | McDowell .................. 342/378 |
| 6,031,879 A | 2/2000 | Pace et al. .................. 375/316 |
| 6,052,421 A | 4/2000 | Richardson et al. ........ 375/346 |
| 6,057,877 A | 5/2000 | Limberg ....................... 348/21 |
| 6,133,873 A | 10/2000 | Krasner ................. 342/357.12 |

OTHER PUBLICATIONS

A.D. Lanterman, Tracking and Recognition of Airborne Targets Via Commercial Television and FM Radio Signals, Acquisitions, Tracking and Pointing XIII, Orlando, FL, USA, Apr. 7–8, 1999, vol. 3692, pp. 189–198.

J.D. Sahr et al., The Manastash Ridge Radar: A Passive Bistatic Radar For Upper Atmosphereic Radio Science, Radio Science, Nov.–Dec. 1997, vol. 32, No. 6, pp. 2345–2358.

T. Tuan et al., An FPGA–Based Array Processor for an Ionospherio–Imaging Radar, 2000 IEEE, Apr. 17, 2000, pp. 313–314.

T. Tsao et al., Ambiguity Function For A Bistatic Radar, 1992 IEEE, Oct. 4, 1992, pp. 497–500.

US 6,738,021 B2

SYSTEM AND METHOD FOR DETECTION AND FEATURE EXTRACTION IN PASSIVE COHERENT LOCATION APPLICATIONS

CROSS REFERENCE TO RELATED APPLICATIONS

This application claims benefit of U.S. Provisional Patent Application No. 60/288,493 entitled "System and Method for Detection and Feature Extraction for PCL Applications," filed May 4, 2001, which is hereby incorporated by reference.

BACKGROUND OF THE INVENTION

1. Field of the Invention

The present invention relates to a passive coherent location ("PCL") radar system and method, and more particularly, to a system and method for detection and feature extraction for PCL radar applications.

2. Discussion of the Related Art

PCL radar systems may be represented by a multistatic radar system. A multistatic radar system has many receivers that are separated from one or more transmitters. The radiated signal from a transmitter arrives at a receiver via two separate paths. One path may be a direct path from the transmitter to the receiver, and the other path may be a target path that includes an indirect path from the transmitter to a target to the receiver. Measurements may include a total path length, or transit time, of the target path signal, the angle of arrival of the target path signal, and the frequency of the direct and target path signals. A difference in frequency may be detected according to a doppler effect if the target is in motion.

Knowledge of the transmitted signal is desirable at the receiver if information is to be extracted from the target path signal. The transmitted frequency is desired to determine the doppler frequency shift. A time or phase reference also is desired if the total scattered path length is to be determined. The frequency reference may be obtained from the direct signal. The time reference also may be obtained from the direct signal provided the distance between the transmitter and the receiver is known.

Multistatic radar systems may be capable of determining the presence of a target within the coverage of the radar, the location of the target position, and a velocity component, or doppler, relative to the radar. The process of locating the target position may include a measurement of a distance and the angle of arrival. The measurement determination of distance relative to the receiving site may require both the angle of arrival at the receiving site and the distance between transmitter and receiver. If the direct signal is available, it may be used as a reference signal to extract the doppler frequency shift.

In PCL radar systems, transmitters may be known as illuminators. Illuminators may be wideband sources of opportunities that include commercial frequency modulated ("FM") broadcast transmitters and/or repeaters, commercial high-definition television ("HDTV") broadcast transmitters and/or repeaters, and the like. Known techniques for wideband signal pre-detection processing and co-channel interference mitigation exist. Known approaches include an array of antennas used to receive the source of opportunity to be exploited, such as the primary illuminator, and any other co-channel signals present in the environment.

After the received signals have been processed, target parameters should be extracted and new targets detected. Existing targets may be updated with the data for the current processing interval. The detection and feature extraction of target information should be performed in an accurate and timely manner. Incorrect or invalid detections may waste processing resources and require additional computing. Further, a system should detect new targets without false alarms from noise or ground clutter. Thus, a PCL radar system should be able to detect targets and extract features of those targets in an efficient and accurate manner

SUMMARY OF THE INVENTION

Accordingly, the present invention is directed to PCL applications and signal processing within the PCL application.

According to an embodiment, a method for detecting and extracting target information during a coherent processing interval within a passive coherent location system is disclosed. The method includes forming an ambiguity surface having ambiguity surface data for the coherent processing interval. The method also includes identifying bins from a previous ambiguity surface. The method also includes associating the bins from the previous ambiguity surface with the ambiguity surface data. The method also includes identifying new bins for new target echoes within the ambiguity surface.

According to another embodiment, a method for detecting and extracting target data for targets within a coherent processing interval in a passive coherent location system is disclosed. The method includes generating an ambiguity surface. The method also includes associating bins with the ambiguity surface. The method also includes forming peak detections from the bins. The peak detections correlate to target echoes within the coherent processing interval. The method also includes estimating targets parameters from the peak detections.

According to another embodiment, a method for extracting target parameters of potential targets from ambiguity surface data of an ambiguity surface in a passive coherent location system is disclosed. The ambiguity surface data correlates to a coherent processing interval and with echoes of the potential targets. The method includes retrieving a previous ambiguity surface. The method also includes comparing the ambiguity surface data with the previous ambiguity surface to identify bins associated with known targets. The method also includes updating the bins with the ambiguity surface data. The method also includes identifying new bins for new target echoes of the potential target echoes. The method also includes grouping the bins and the new bins into peak detections. The method also includes estimating the target parameters for the potential targets from the peak detections.

According to another embodiment, a system for detecting and extracting features of potential targets from an ambiguity surface for a coherent processing interval in a passive coherent location system is disclosed. The system includes an ambiguity surface formation function performing the ambiguity surface and generating the ambiguity surface data. The system also includes a peak/noise discrimination function for identifying bins for known targets and new targets with the ambiguity surface data. The system also includes a peak association function for grouping the bins to determine peak detections associated with the known and new targets. The surface also includes a parameter estimation function for estimating target parameters for the known and new targets from the peak detections. The system also includes a peak editing function for editing the peak detections.

According to another embodiment, a method for detecting and extracting features for targets identified by a passive coherent location system is disclosed. The method includes associating bins with an ambiguity surface data. The method also includes forming peak detections from the bins.

According to another embodiment, a passive coherent location radar system having a detection and feature extraction processing subsystem to detect targets and determine target parameters from ambiguity surface data of an ambiguity surface is disclosed. The passive coherent location radar system includes a peak/noise discriminator to compare previous ambiguity surface data to the ambiguity surface data and to update bins correlating to the previous ambiguity surface data. The passive coherent location radar system also includes new bins identified by the peak/noise discriminator for new target echoes within the ambiguity surface. The passive coherent location radar system also includes a peak associator to group the bins and the new bins identified by the peak/noise discriminator to form peak detections correlating to the targets. The passive corherent location radar system also includes a parameter estimator to estimate the target parameters from the peak detections.

Additional features and advantages of the invention will be set forth in the description, which follows, and in part will be apparent from the description, or maybe learned, by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide further understanding of the invention and are incorporated in and constitute a part of this specification, illustrate embodiments of the present invention and together with the description, serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
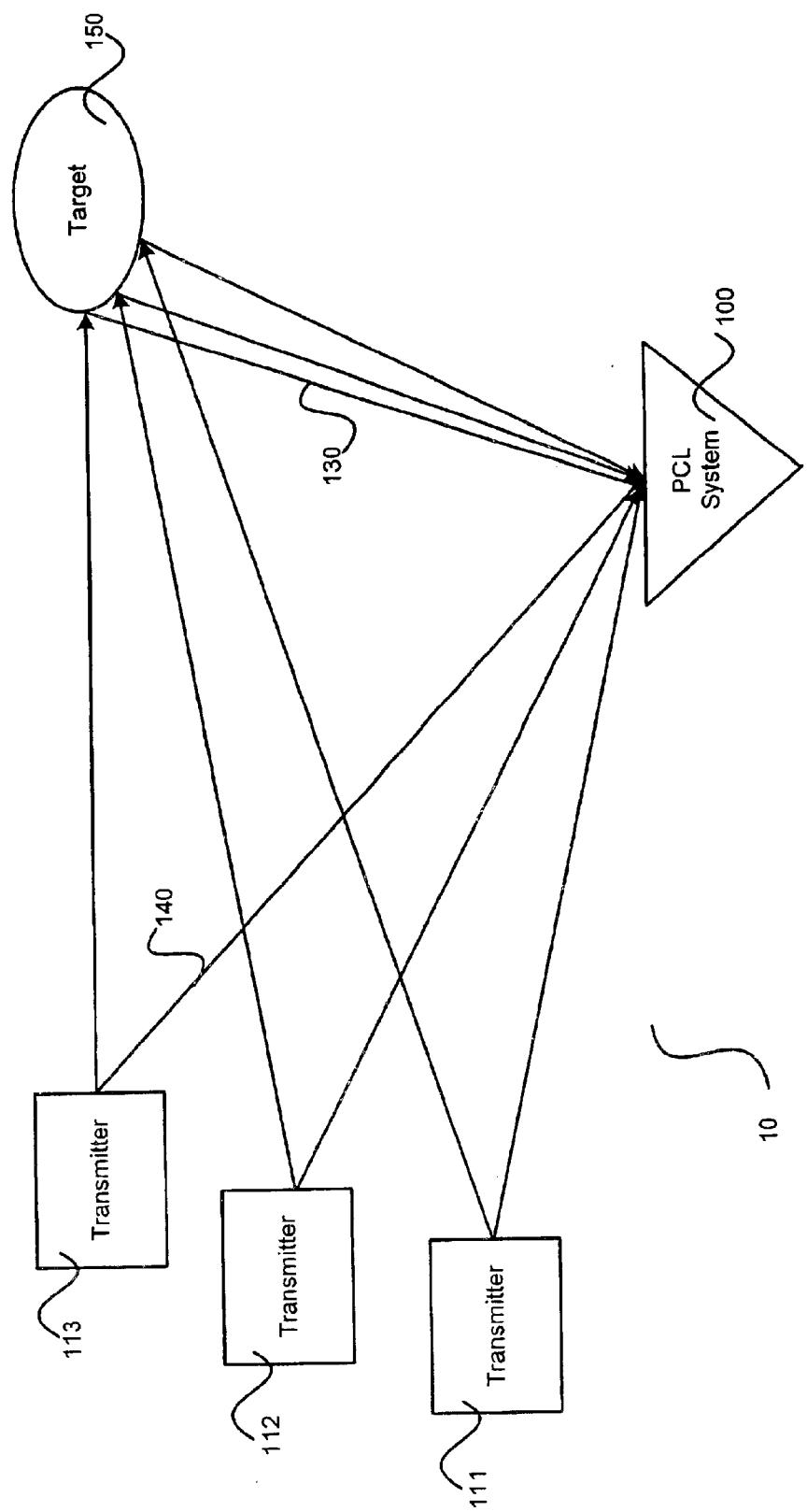
FIG. 1 illustrates a block diagram of a radar system, a target, and transmitters in accordance with an embodiment of the present invention.

FIG. 1 depicts a block diagram of a radar system, a target and transmitters in accordance with an embodiment of the present invention. Radar detection system 10 includes a PCL system 100 for detecting one or more targets of interest 150, using a plurality of transmitters 110, 112 and 114. PCL system 100 represents a family of multi-static wide area target surveillance sensors. PCL 100 system exploits continuous wave ("CW") electromagnetic energy, often from sources of opportunity that may be operating for other purposes. Sources of opportunity may include television broadcast stations and FM radio stations. Preferably, PCL system 100 may receive transmissions from a plurality of uncontrolled transmitters, also known as sources of opportunity, 110, 112, and 114. More preferably transmitters 110, 112, and 114 may be wideband sources of opportunity that include commercial FM broadcast transmitters and/or repeaters and commercial HDTV TV broadcast transmitters and/or repeaters. Transmitters 110, 112, and 114, however, are not limited to these sources of opportunity and may include any device, system or means to transmit uncontrolled signals.

Transmitters 110, 112, and 114 may transmit wideband electromagnetic energy transmissions in all directions. Some of these transmissions are reflected by one or more targets of interest 150 and received by PCL system 100. For example, reflected transmission 130 may be reflected by target 150 and received by PCL system 100. Further, with regard to transmitter 114, reference transmission 140 is received directly by PCL system 100. PCL system 100 may compare reference transmission 140 and reflected transmission 130 to determine positional information about one or more targets of interest 150. Reference transmission 140 also may be known as a direct path signal. Reflected transmission 130 also may be known as a target path signal. Positional information may include any information relating to a position of target 150, including location, velocity, and acceleration from determining a time difference of arrival ("TDOA"), a frequency difference of arrival ("FDOA") and an angle of arrival ("AOA").

Figure 2:
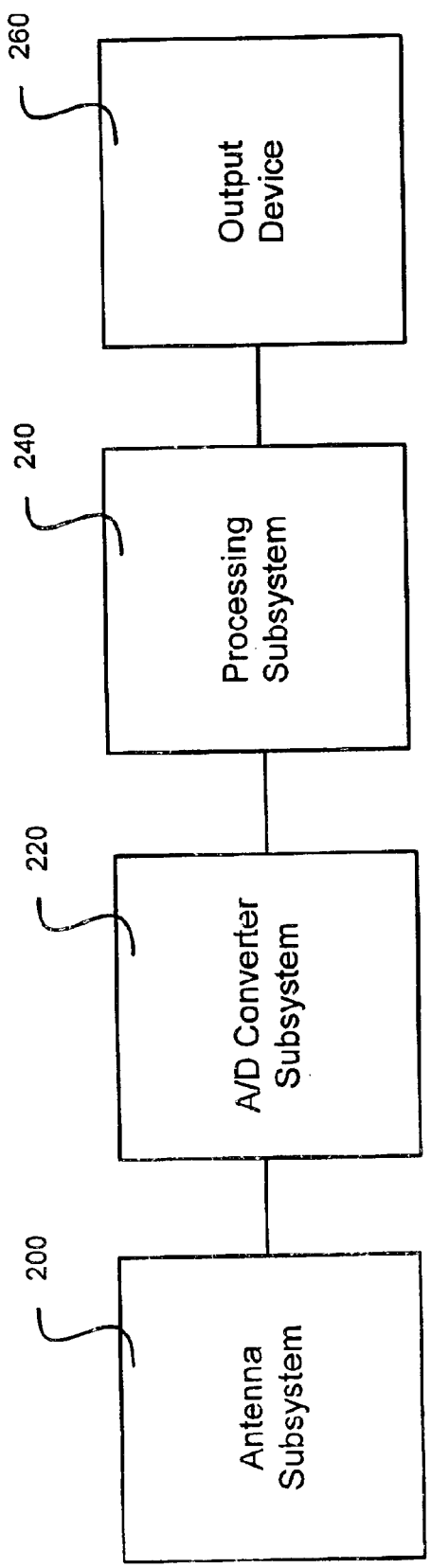
FIG. 2 illustrates a block diagram of a passive coherent location system in accordance with an embodiment of the present invention.

FIG. 2 depicts a block diagram of a passive coherent location system in accordance with an embodiment of the present invention. PCL system 100 may include antenna subsystem 200, analog to digital converter ("ADC") subsystem 220, processing subsystem 240, and output device 260. Antenna subsystem 200 receives electromagnetic energy transmissions, including reflected transmission 130 and reference transmission 140 of FIG. 1, with at least one antenna. ADC subsystem 220 receives the signal outputs of antenna subsystem 200 and outputs digital samples of the signals at its input by sampling the signals at a sampling rate and forming a digital waveform using the magnitude for the analog signal at each sampling interval. Processing subsystem 240 receives the output of assembly subsystem 220 and processes the signals for measurement data, tracking, target updates, and the like. Output device 260 receives the processing result and displays the output of processing subsystem 230.

Figure 3:
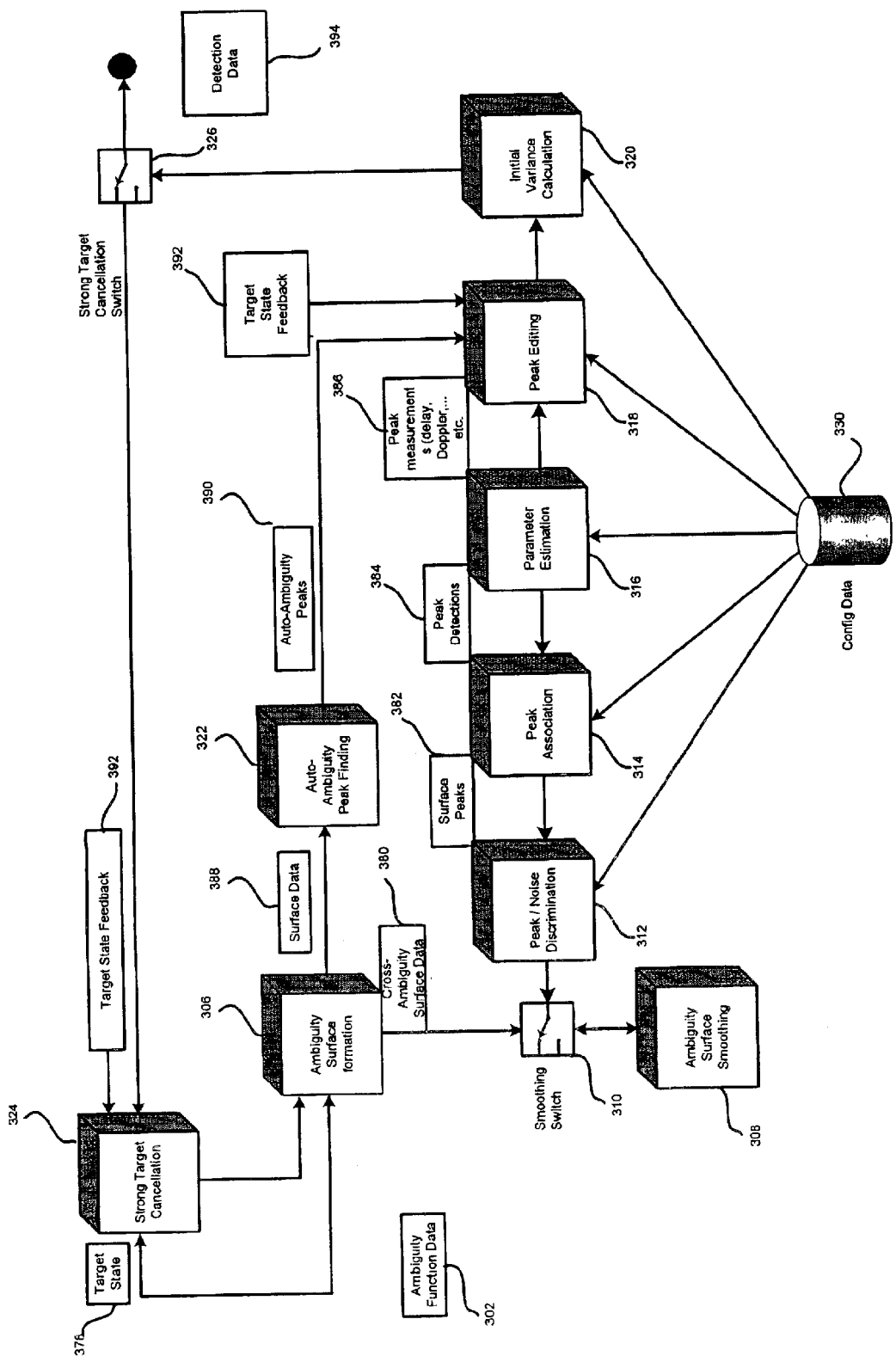
FIG. 3 illustrates a block diagram of a detection and feature extraction processing subsystem in accordance with an embodiment of the present invention.

FIG. 3 depicts a block diagram of a detection and feature extraction processing subsystem 300 in accordance with an embodiment of the present invention. Detection feature extraction processing subsystem 300 may be incorporated into processing subsystem 240 of FIG. 2. Alternatively, detection and feature extraction processing subsystem 300 may be incorporated in ADC subsystem 220.

Detection and feature extraction processing subsystem 300 is responsible for providing detection data used in measurement association operations. Detection and feature extraction processing subsystem 300 receives ambiguity surface data for each ambiguity surface. The ambiguity surface data may be smoothed by a simple smoothing function. Each cross-ambiguity surface may be scanned for bins that represent targets, or residual ground clutter. The bins may be associated across targeting beams or surfaces to form the peak detections for the current update. Target measurement parameters of delay, doppler, angle of arrival, signal power, and signal to noise ratio ("SNR") for each peak detection are estimated from the peak's location and the associated energy. Further, the variances of the delay, doppler, angle of arrival, and signal power may be calculated.

Each processing cycle may begin with an ambiguity function data block 302 being input to detection and feature extraction processing sub-system 300 from pre-detection operations. Ambiguity function data block 302 may contain ambiguity surface data. Ambiguity surface data may be an ambiguity diagram that represents the response of a matched filter to a signal as well as mismatched signals. The output of the matched filter, or the ambiguity diagram, may proximate a cross-correlation between a received signal and a transmitted signal. Thus, the ambiguity diagram may have peaks that correlate to target detections.

Ambiguity function data 302 is input to ambiguity surface formation function 306. Ambiguity surface formation function 306 prepares each ambiguity function for subsequent detection processing operations. Thus, ambiguity function data 302 is received for each cycle and ambiguity function formation function 306 prepares the data for that cycle. These cycles may be known as coherent processing intervals ("CPIs").

Ambiguity surface smoothing function 308 reduces irregularities in the cross-ambiguity surfaces prior to discrimination of target peaks from background noise of cross-ambiguity surface data 380. Ambiguity surface formation function 306 outputs the smoothed ambiguity function data 302 as cross-ambiguity surface data 380. Three alternatives may be implemented for ambiguity surface smoothing. A simple smoothing function averages N×N adjacent points to smooth the raw ambiguity surface produced by ambiguity surface formation function 306. A conventional ambiguity surface smoothing function may be accomplished by the application of a two-dimensional filter kernel to the raw ambiguity surface of cross-ambiguity surface data 380. A fast convolution smoothing function also may be applied of a two-dimensional filter kernel to the raw ambiguity surface, but may be applied directly to the decimated lag-products from pre-detection processing, thereby avoiding the need to form raw ambiguity functions in pre-detection processing. Fast convolution smoothing function may provide computational savings over the other ambiguity surface smoothing processes. Ambiguity surface smoothing function 308 may be enabled by smoothing switch 310. Thus, if detection and feature extraction processing sub-system 300 desires to reduce irregularities in cross-ambiguity surface data 380, the smoothing switch 310 is configured to enable ambiguity surface smoothing function 308.

Cross-ambiguity surface data 380 then is received by peak/noise discrimination function 312. Peak/noise discrimination function 312 identifies those bins within cross-ambiguity surface data 380 that are likely to have been produced by a target echo, or by residual ground clutter. An algorithm may be implemented by peak/noise discrimination function 312 that is predicated on the conclusion that the bins identified by peak/noise discrimination function 312 for the previous ambiguity surface update may be a reasonable initial guess for the set of bins for the current update. Thus, the algorithm may compare the previous ambiguity surface data with the current ambiguity surface data. All of the bins associated with known targets or residual ground clutter maybe revisited with the current ambiguity surface data, such as cross-ambiguity surface data 380. After the comparison, cross-ambiguity surface data 380 may be examined for new target echoes. An estimate of the noise floor may be produced based upon the average power in these remaining bins. Using this information, peak/noise discrimination function 312 may detect surface peaks 382.

Surface peaks 382 are received by peak association function 314. Peak association function 314 may group bins identified by the peak/noise discrimination function 312 into discrete peaks. These discrete peaks may be known as peak detections, such as peak detections 384. Parameter estimation function 316 receives peak detections 384 to estimate the primary target parameters from the detected peaks. Primary target parameters may include signal-to-noise ratio, time delay, doppler shift, angle of arrival, signal power, and the like. Parameter estimation function 316 also may perform feature extraction on the detected peaks of peak detections 834. Feature extractions may derive more advanced targeted parameters, such as blade rates, bi-static radar cross sections, and the like. Thus, parameter estimation function 316 calculates the peak measurements 386. Peak measurements 386 are received by peak editing function 318. Peak editing function 318 may reduce the number of detected peaks that cause false alarms and are not the result of target echoes. Peak editing function 318 is disclosed in greater detail with reference to FIG. 4 below.

Peak editing function 318 also receives target state feedback 392. Target state feedback 392 may be derived from ambiguity function data 302. Peak editing function 318 also receives auto-ambiguity peaks 390 from auto-ambiguity peak finding function 322. Auto-ambiguity peak finding function 322 receives surface data 388 from ambiguity surface formation function 306. Auto-ambiguity peak finding function 322 may scan surface data 388 for peaks that match criteria that indicate modulation artifacts for higher signal-to-noise ratio peaks within surface data 388. This operation may characterize sidelobes of peaks within ambiguity function data 302. Auto-ambiguity data 290 are forwarded to peak editing function 318 for sidelobe processing operations.

Initial variance calculation function 320 may define a variance for each target parameter that can be used in a subsequent line tracking function that receives detection data 394. Detection data 394 is the output of detection and feature extraction processing subsystem 300. A line tracking function may use these variances to update its Kalman filter state vectors. The measurement variance calculations used for the implementation may be based on the Cramer-Rao boundary. Configuration data 330 may provide system configuration or technical information regarding PCL radar system 100 used with detection and feature extraction processing subsystem 300. Further, configuration data 330 may provide default values or constant values for the algorithms implemented by the various functions within detection and feature extraction processing subsystem 300.

Strong target cancellation function 324 may receive target state data 378 from ambiguity function data 302. Strong target cancellation function 324 also may receive target state feedback 392. A strong target cancellation switch 324 enables the strong target cancellation function 324, if desired. Preferably, strong target cancellation switch 324 activates strong target cancellation function 324. If ambiguity function data 302 includes strong target data, then the strong target data may canceled and the ambiguity surface formation function 306. A strong target may indicate a detected peak that skews other peaks within ambiguity function data 302. By canceling the strong target, the other peaks and data with an ambiguity function data 302 may be analyzed in a more efficient manner.

Detection data 394 is the output of detection and feature extraction processing subsystem 300. Detection data 394 may be a data block of new peak detections for the current update. The data block may include the number of peak detections for each illuminator, the number of bins processed for each illuminator, the associated time of the current update, current frequencies for each illuminator, the average root-mean-squared bandwidth of the reference signal for each illuminator, the system noise figure for each illuminator, the measurement data associated with each peak detection, and the like. This data may be used by a subsequent line tracking function to update target estimation state. Individual peak detections of detection data 394 may contain measurement data that is used for these updates. The measurement data depicted in Table 1 below is an example of the perimeters included for each individual peak detection.

TABLE 1

| Parameter | Description | Units |
|---|---|---|
| dwell_time | dwell time stamp | mm/dd/yy hh:mm:ss:ssssss |
| $t_d$ | delay | Sec |
| $\sigma^2_{t_d}$ | delay variance | $sec^2$ |
| $f_d$ | doppler | Hz |
| $\sigma^2_{f_d}$ | doppler variance | $Hz^2$ |
| $\theta$ | angle of arrival | rad |
| $\sigma_\theta^2$ | angle of arrival variance | $rad^2$ |
| P | signal power | DBm |
| $\sigma_P^2$ | signal power variance | $mw^2$ |
| SNR | signal to noise ratio | DB |
| illum_id | illuminator ID | String |

Figure 4:
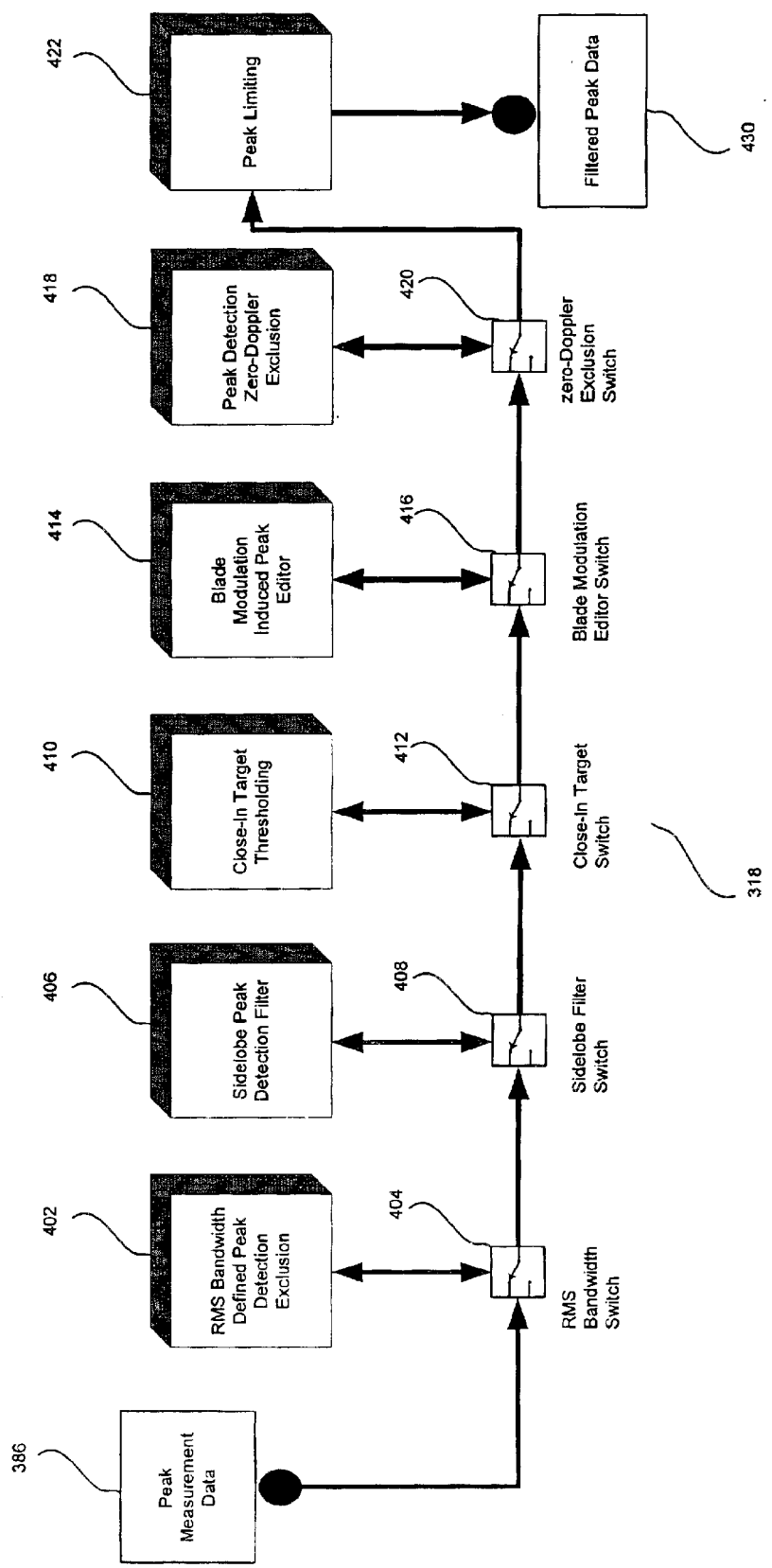
FIG. 4 illustrates a block diagram for a peak editing function in accordance with an embodiment of the present invention.

FIG. 4 depicts a block diagram for a peak editing function in accordance with an embodiment of the present invention. Peak editing function 318 is depicted in greater detail to better disclose embodiments of the present invention. Peak editing function 318, however, is not limited to the embodiment depicted in FIG. 4. As noted above, peak editing function 318 may reduce the number of detected peaks that may cause false alarms and are not the result of target echoes within peak measurement data 386. Peak editing function 318 may comprise several functions and filters that accomplish this task. FIG. 4 depicts an overview of the filters and functions that comprise peak editing function 318. Poor reference signal characteristics, signal modulation artifacts, and residual ground clutter may result in unwanted detection peaks. The function and filters disclosed below may be enabled to prevent these detections from being processed further. Peak measurement data 386 is received at peak editing function 318. Peak measurement data 386 may include primary target parameters from detected peaks.

Root-mean-squared bandwidth defined peak detection exclusion function 402 may be enabled by root-mean-squared bandwidth switch 404. In order to prevent false peaks due to bad cross-correlations when the reference signals bandwidth collapses, root-mean-squared bandwidth switch 404 is enabled in the detection processing to disregard the current peak detection if the realized bandwidth associated with that peak detection falls below a threshold. This threshold may be defined by root-mean-squared bandwidth defined peak detection exclusion function 402.

Sidelobe peak detection filter 406 may be enabled by sidelobe filter switch 408. Sidelobe peak detection filter 406 may remove detected peaks that are modulation artifacts of a higher SNR ratio. The peak detections from the cross-ambiguity surfaces and the peaks found by the auto-ambiguity peak finding function 322 or the current processing interval update may be sorted from the strongest to weakest at the entry of sidelode peak detection filter 406. By being sorted from strongest to weakest, weaker sidelobe peaks may be removed by sidelobe filter switch 408 if enabled.

Close-in target thresholding function 410 may be enabled by close-in target switch 412. If enabled, a threshold ramp may be used to desensitize the detector to close-in targets. Due to reduced propagation losses, a close-in target may have a higher signal-to-noise ratio that triggers high sidelobes that may be interpreted by the detector as peaks. The desensitization is implemented as an adaptive threshold based upon a peak's time delay measurement. Thus, close-in target thresholding function 410 may remove all sidelobes that are a result of close-in targets.

Blade modulation induced peak editor 414 may be enabled by blade modulation editor switch 416. Blade modulation induced peak editor 414 may be enabled in order to prevent peak detections that are replicated in doppler space due to aircraft blade modulation effects. If an aircraft has rotors, the rotors may cause blade doppler shifts in addition to any doppler shifts from the aircraft. Blade modulation induced peak editor 414 may be enabled if the PCL system 100 is being used in conjunction with aircraft detection operations.

Peak detection zero-doppler exclusion function 418 may be enabled by the zero-doppler exclusion switch 420. Peak detection zero-doppler exclusion function 418 may be enabled in order to prevent detections that are distorted due to zero-doppler cancellation effects from associating with existing line tracks. A zero-doppler exclusion zone may be defined for peak detection promotion.

The data used by the peak editing functions and filters may be calculated in pre-detector processing operations. For example, zero-doppler cancellation and root-mean-squared bandwidth calculations may be performed during wideband processing operations, and those valves used here.

Peak limiting function 422 may bound the final number of peaks promoted by the functions disclosed with reference to peak editing function 318. The peaks are promoted to the tracking algorithms for further processing. The peaks with largest signal-to-noise ratios may be the ones that form the peak detection block output, or detection data 394. Filtered peak data 430 may be included within detection data 394. Thus, peak editing function 318 filters peak detections to remove detections caused by sidelobes, close-in targets, and blade modulations effects.

Figure 5:
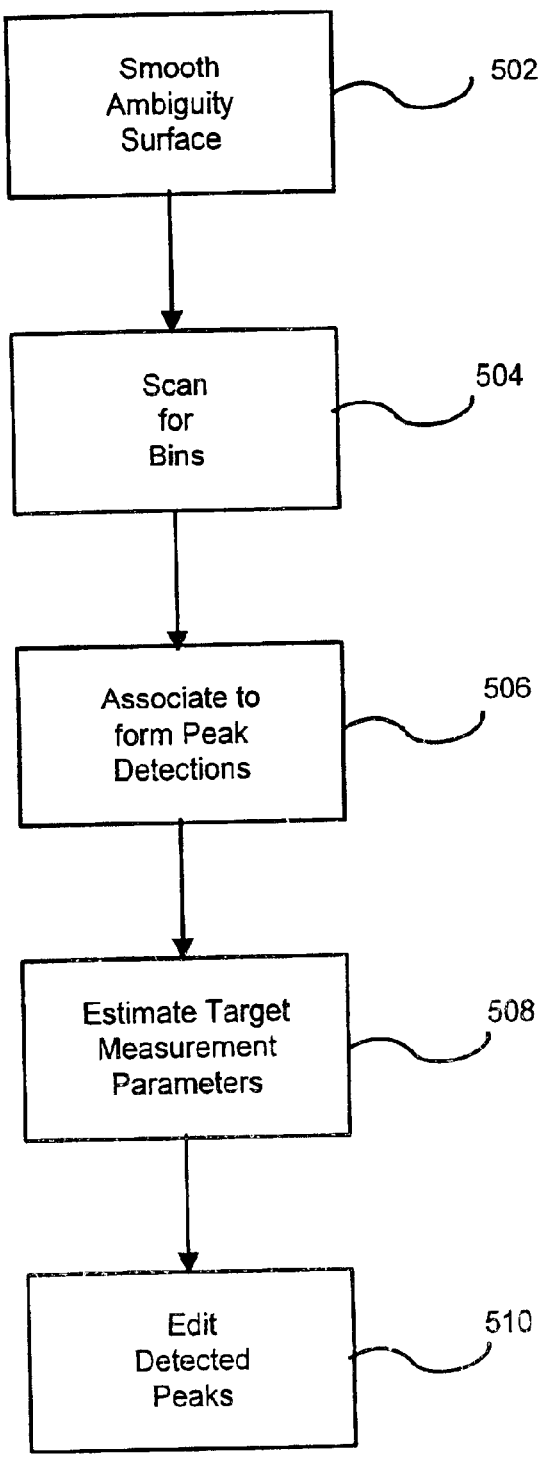
FIG. 5 illustrates a flowchart for detecting and extracting features for PCL operations in accordance with an embodiment of the present invention.

FIG. 5 depicts a flowchart for detecting and extracting features for PCL operations in accordance with an embodiment of the present invention. Step 502 executes by smoothing ambiguity surface data. If configured, the ambiguity smoothing surface may be smoothed by a simple N×N smoothing function. The above disclosed alternatives for implementing the ambiguity surface smoothing function may be used. Irregularities may be reduced in the ambiguity surface data prior to detecting and extracting targets peaks from background noise.

Step 504 executes by scanning the bins that represent targets or residual ground clutter. Each cross-ambiguity surface may be scanned with these bins. A peak-noise discrimination output may be implemented to scan the surface data for those bins that are likely to have been produced by target echoes. Step 506 executes by associating the bins across the target beams or surfaces to form the peak detections for the current update. For example, the ambiguity function data that spawns the ambiguity surface data may be received by during the discrete updates. This data is analyzed and scanned to determine peak detections as a result of target echoes. The bins identified in step 506 may be grouped into discrete peaks to form peak detections. Step 508 executes by estimating target measurement parameters for the peak detections. Target measurement parameters of delay, doppler, angle of arrival, signal power, and signal-to-noise ratio, and the like, for each peak detection may be estimated from the peak's location and energy. Further, the variances of the delay, doppler, angle of arrival, and signal power, and the like may be estimated from the detection peaks. Step 510 executes by editing the detected peaks to reduce the number of detected peaks that may cause false alarms and may not be a result of a target echo. Filters and functions may be enabled to prevent these false peak detections from being processed.

Figure 6:
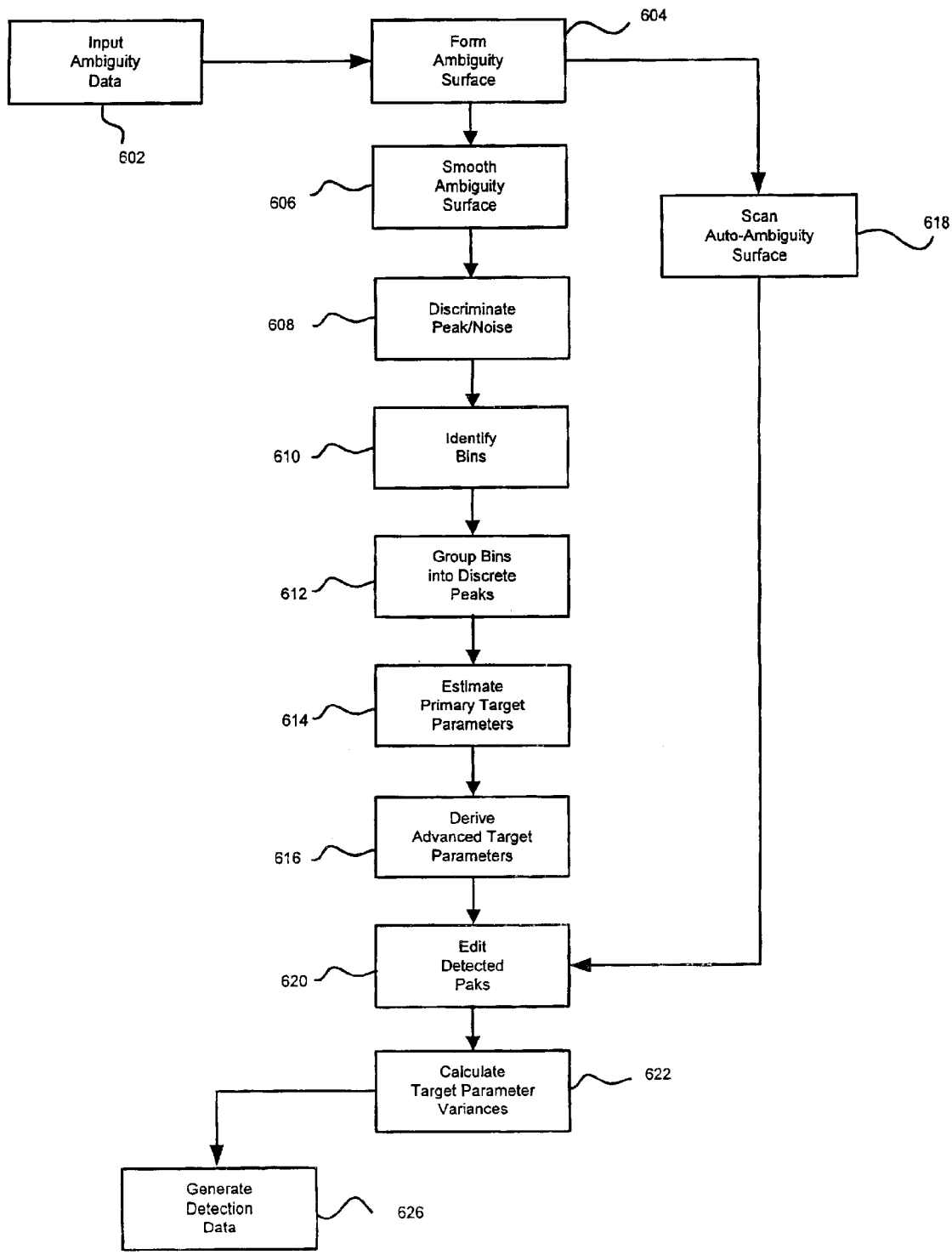
FIG. 6 illustrates a flowchart for detecting and extracting features from ambiguity function data in accordance with an embodiment of the present invention.

FIG. 6 depicts a flowchart for detecting and extracting features from ambiguity function data in accordance with another embodiment of the present invention. Step 602 executes by inputting ambiguity function data. For example, ambiguity function data 302 may be input to detection and feature extraction processing sub-system 300. Step 604 executes by forming an ambiguity surface having surface data cross-ambiguity surface data. Further, step 604 may cancel strong target data from the ambiguity surface data. Step 606 executes by smoothing the ambiguity surface data to reduce irregularities prior to discrimination of target peaks from background noise. As noted above, three alternatives for ambiguity surface smoothing may be implemented. Once the ambiguity surface data has been smoothed, step 608 executes by discriminating target peaks from noise. The bins identified by a peak/noise discrimination function with a previous ambiguity surface update may be an initialized for the current update. Thus, previous peak detections may be compared to the current ambiguity surface data to update target echo detections. Step 610 executes by identifying bins that were comparable to previous ambiguity surface updates in step 608. Once all of the bins associated with known targets or residual ground clutter have been reexamined, the ambiguity surface is examined for new target echoes. Further, an estimate of the noise formula may be produced based on the average power in the remaining bins.

Step 610 executes by grouping bins into discrete peaks. These bins may be identifiable by the peak/noise discrimination operations of step 608. Step 614 executes by estimating the primary target perimeters from the detected peaks. The primary targets may include signal-to-noise ratio, time delay, doppler, angle of arrival, signal power, and the like. Step 616 executes by deriving the advanced target perimeters with the detected peaks. Advanced target perimeters may include blade rates, bi-static radar cross-sections, and the like. The advanced target perimeters correlate to the primary target perimeters for the detected peaks. The primary target perimeters and the advanced target perimeters may be used by line tracking functions within PCL system 100.

Step 618 executes by scanning the auto-ambiguity surface data that is formed within step 604. By scanning the auto-ambiguity surface data, auto-ambiguity peaks may be detected. Step 620 executes by editing the detected peaks using the auto-ambiguity peaks from step 618 as well as target parameter data from step 614 and step 616. The detected peaks are edited to reduce the number of peaks that may cause false alarms and are not the result of a target echo. Filtered operations and other discrimination functions may be enabled to prevent bogus peak detections from being processed further. Step 622 executes by calculating target parameter variance. A variance for each target parameter may be defined to be used in later line tracking functions. Step 626 executes by generating detection data to be output for further processing. Preferably, the detection data is output to a line tracking function to associate peak measurement data with existing target detections, or to generate new target detection data.

Figure 7:
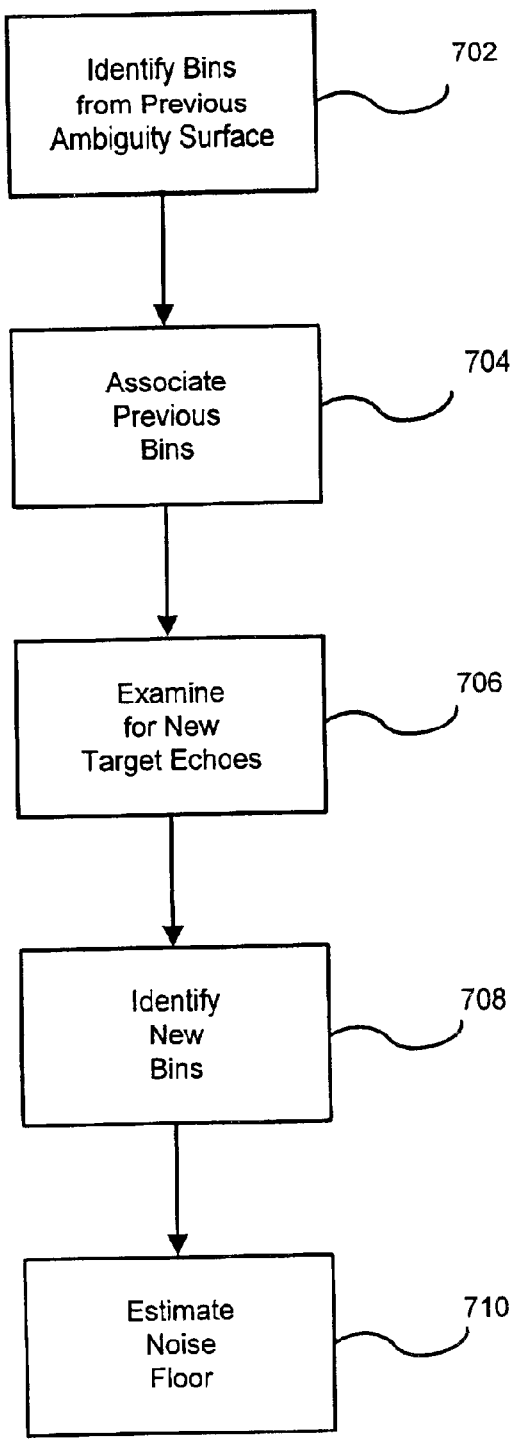
FIG. 7 illustrates a flowchart for discriminating peaks from noise in accordance with an embodiment of the present invention.

FIG. 7 depicts a flowchart for discriminating peaks from noise in accordance with an embodiment of the present invention. FIG. 7 may correlate the steps 608 and 610 of FIG. 6. Steps 608 and 610, however of, FIG. 6 are not limited by the disclosed steps of FIG. 7.

Step 702 executes by identifying bins from a previous ambiguity surface. The previous ambiguity surface may be an update prior in time to the current update. Step 704 executes by associating previous bins within the previous ambiguity surface with the current bins of the current ambiguity surface. Previous bins may be used as initial guesses for the set of bins within the current ambiguity surface update. Step 706 executes by examining the ambiguity surface for new target echoes. Peaks that were not correlated to previous ambiguity surface updates may be used in calculating target perimeters for newly detected targets. Step 708 executes by identifying the new bins according to the detected peaks. Step 710 executes by estimating those four based upon the average power in the remaining bins not associated with a target echo of residual ground clutter It will be apparent to those skilled in the art that various modifications and variations can be made in the disclosed embodiments of the present invention without departing from the spirit or scope of the invention. Thus, it is intended that the present invention embody the modifications and variations of this invention provided that they come within the scope of any claims and their equivalents.

What is claimed is:

1. A method for detecting and extracting target information during a coherent processing interval within a passive coherent location system, comprising:

forming an ambiguity surface having ambiguity surface data for said coherent processing interval;

identifying bins from a previous ambiguity surface;

associating said bins from said previous ambiguity surface with said ambiguity surface data; and identifying new bins for new target echoes within said ambiguity surface.

2. The method of claim 1, further comprising smoothing said ambiguity surface.

3. The method of claim 1, further comprising comparing said ambiguity surface with said previous ambiguity surface.

4. The method of claim 3, further comprising scanning said ambiguity surface for said bins.

5. The method of claim 1, further comprising associating said bins from previous ambiguity surface and said new bins across targeting beams to form peak detections.

6. The method of claim 5, further comprising estimating target parameters from said peak detections.

7. The method of claim 6, further comprising editing said peak detections.

8. The method of claim 1, further comprising estimating a noise floor.

9. The method of claim 8, wherein said estimating includes determining an average power of said new bins as said noise floor.

10. A method for detecting and extracting target data for targets within a coherent processing interval in a passive coherent location system, comprising:
    generating an ambiguity surface;
    associating bins with said ambiguity surface;
    forming peak detections from said bins and a plurality of old bins from a previous ambiguity surface, wherein said peak detections correlate to target echoes within said coherent processing interval; and
    estimating target parameters from said peak detections.

11. The method of claim 10, further comprising editing said peak detections.

12. The method of claim 11, wherein said editing includes receiving peak measurement data of said peak detections.

13. The method of claim 11, wherein said editing includes filtering sidelobe peaks from said peak detections.

14. The method of claim 11, wherein said editing includes removing sidelobes from close-in targets from said peak detections.

15. The method of claim 11, wherein said editing includes removing detected blade modulation peak detections from said peak detections.

16. The method of claims 11, wherein said editing includes removing from said peak detections those peak detections from zero-Doppler cancellation effects.

17. The method of claim 10, further comprising smoothing said ambiguity surface.

18. The method of claim 10, further comprising estimating variances of said target parameters.

19. The method of claim 10, further comprising outputting detection data comprising said peak detections for said coherent processing interval.

20. The method of claim 19, wherein said outputting includes outputting to a line tracker.

21. The method of claim 19, wherein said detection data further comprises said target parameters for said peak detections.

22. A method for extracting target parameters of potential targets from ambiguity surface data of an ambiguity surface in a passive coherent location system, wherein said ambiguity surface data correlates to a coherent processing interval and with echoes of said potential targets, comprising:
    retrieving a previous ambiguity surface;
    comparing said ambiguity surface data with said previous ambiguity surface to identify bins associated with known targets;
    updating said bins with said ambiguity surface data;
    identifying new bins for new target echoes of said potential target echoes;
    grouping said bins and said new bins into peak detections; and
    estimating said target parameters for said potential targets from said peak detections.

23. The method of claim 22, further comprising outputting said peak detections and said target parameters.

24. A system for detecting and extracting features of potential targets from an ambiguity surface for a coherent processing interval in a passive coherent location system, comprising:
    an ambiguity surface formation function for forming said ambiguity surface and generating ambiguity surface data;
    a peak/noise discrimination function for identifying bins for known targets and new targets with said ambiguity surface data, said known targets being identified in a previous ambiguity surface;
    a peak association function for grouping said bins to determine peak detections associated with said known and new targets;
    a parameter estimation function for estimating target parameters for said known and new targets from said peak detections; and
    a peak editing function for editing said peak detections.

25. The system of claim 24, wherein said peak/noise discrimination function estimates of a noise floor from an average power of said new bins.

26. The system of claim 24, further comprising a variance calculation function for defining a variance for said target parameters.

27. The system of claim 24, further comprising an output including said peak detections and said target parameters.

28. The system of claim 24, further comprising an ambiguity surface smoothing function for smoothing said ambiguity surface.

29. The system of claim 28, wherein said ambiguity surface smoothing function is enabled by a smoothing switch between said ambiguity surface smoothing function and said ambiguity surface formation function.

30. The system of claim 24, wherein said peak editing function includes a sidelobe peak detection filter.

31. The system of claim 24, wherein said peak editing function includes a root-mean-squared bandwidth defined peak detection exclusion function.

32. The system of claim 31, wherein said root-mean-squared bandwidth defined peak detection exclusion function defines a threshold such that a peak detection below said threshold is excluded.

33. The system of claim 24, wherein said peak editing function includes a close-in target thresholding function.

34. The system of claim 24, wherein said peak editing function includes a blade modulation induced peak editor.

35. The system of claim 24, wherein said peak editing function includes a peak detection zero-Doppler exclusion function.

36. The system of claim 24, wherein said peak editing function includes at least one function to edit said peak detections and at least one switch to enable said at least one function.

37. The system of claim 24, wherein said peak editing function includes at least one filter to edit said peak detections and at least one switch to enable said at least one filter.

38. The system of claim 24, further comprising a strong target cancellation function to cancel strong target peak detections.

39. The system of claim 38, wherein said strong target cancellation function is enabled by a strong target cancellation switch.

40. The system of claim 24, wherein said ambiguity surface formation receives ambiguity function data correlating to said ambiguity surface.

41. A method for detecting and extracting features for targets identified by a passive coherent location system, comprising:
    associating bins with ambiguity surface data and one or more old bins from a previous ambiguity surface; and
    forming peak detections from said associated bins.

42. The method of claim 41, further comprising estimating target parameters from said peak detections.

43. The method of claim 42, further comprising calculating variances for said target parameters from said peak detections.

44. The method of claim 41, further comprising editing said peak detections with at least one filter.

45. The method of claim 41, further comprising editing said peak detections with at least one editing function.

46. The method of claim 41, further comprising forming an ambiguity surface containing said ambiguity surface data.

47. The method of claim 46, further comprising smoothing said ambiguity surface to remove irregularities from said ambiguity surface.

48. A passive coherent location radar system having a detection and feature extraction processing sub-system to detect targets and determine target parameters from ambiguity surface data of an ambiguity surface, comprising:
- a peak/noise discriminator to compare previous ambiguity surface data to said ambiguity surface data and to update bins correlating to said previous ambiguity surface data;
- new bins identified by said peak/noise discriminator for new target echoes within said ambiguity surface;
- a peak associator to group said bins and said new bins identified by said peak/noise discriminator to form peak detections correlating to said targets; and
- a parameter estimator to estimate said target parameters from said peak detections.

49. The passive coherent location radar system of claim 48, further comprising a peak editor to edit said peak detections.

50. The passive coherent location radar system of claim 48, further comprising an ambiguity surface former to form said ambiguity surface.

51. The passive coherent location radar system of claim 50, further comprising an ambiguity surface smoother to remove irregularities from said ambiguity surface.

52. A system for detecting and extracting target information during a coherent processing interval within a passive coherent location system, comprising:
- means for forming an ambiguity surface having ambiguity surface data for said coherent processing interval;
- means for identifying bins from a previous ambiguity surface;
- means for associating said bins from said previous ambiguity surface with said ambiguity surface data; and
- means for identifying new bins for new target echoes within said ambiguity surface.

53. A computer program product comprising a computer useable medium having computer readable code embodied therein for detecting and extracting target information during a coherent processing interval within a passive coherent location system, the computer program product adapted when run on a computer to execute steps, including:
- forming an ambiguity surface having ambiguity surface data for said coherent processing interval;
- identifying bins from a previous ambiguity surface;
- associating said bins from said previous ambiguity surface with said ambiguity surface data; and
- identifying new bins for new target echoes within said ambiguity surface.

54. A system for detecting and extracting target data for targets within a coherent processing interval in a passive coherent location system, comprising:
- means for generating an ambiguity surface;
- means for associating bins with said ambiguity surface;
- means for forming peak detections from said bins and a plurality of old bins from a previous ambiguity surface wherein said peak detections correlate to target echoes within said coherent processing interval; and
- means for estimating target parameters from said peak detections.

55. A computer program product comprising a computer useable medium having computer readable code embodied therein for detecting and extracting target data for targets within a coherent processing interval in a passive coherent location system, the computer program product adapted when run on a computer to execute steps, including:
- generating an ambiguity surface;
- associating bins with said ambiguity surface;
- forming peak detections from said bins and a plurality of old bins from a previous ambiguity surface, wherein said peak detections correlate to target echoes within said coherent processing interval; and
- estimating target parameters from said peak detections.

56. A system for detecting and extracting features for targets identified by a passive coherent location system, comprising:
- means for associating bins with ambiguity surface data and one or more old bins from a previous ambiguity surface; and
- means for forming peak detections from said associated bins.

57. A computer program product comprising a computer useable medium having computer readable code embodied therein for detecting and extracting features for targets identified by a passive coherent location system, the computer program product adapted when run on a computer to execute steps, including:
- associating bins with ambiguity surface data and one or more old bins from a previous ambiguity surface;; and
- forming peak detections from said associated bins.

* * * * *